United States Patent [19]
Curelop

[11] 3,816,180
[45] June 11, 1974

[54] METHOD FOR PREPARING TEXTURIZED CATHODES

[76] Inventor: Edward J. Curelop, 17 Granite Street, Brockton, Mass. 02402

[22] Filed: July 12, 1972

[21] Appl. No.: 270,915

[52] U.S. Cl. .............................. 136/120 R, 136/75
[51] Int. Cl. ......................................... H01m 35/24
[58] Field of Search.. 136/120 R, 120 FC, 121–122, 136/86 D, 137–139, 83, 68, 75–78, 21; 264/111, 293, 127, 175; 75/223, 226, 214

[56] References Cited
UNITED STATES PATENTS

| | | | |
|---|---|---|---|
| 3,009,979 | 11/1961 | Corren et al. | 136/67 X |
| 3,248,214 | 4/1966 | Kroeger et al. | 75/208 |
| 3,310,437 | 3/1967 | Davee et al. | 136/120 R |
| 3,395,049 | 7/1968 | Thompson | 136/122 |
| 3,409,473 | 11/1968 | Weber et al. | 136/120 FC |
| 3,658,592 | 4/1972 | Dey | 136/83 R |

Primary Examiner—Anthony Skapars
Attorney, Agent, or Firm—Robert Levine

[57] ABSTRACT

A method for preparing depolarizing cathodes of improved performance is disclosed. The method comprises texturizing the surface of the depolarizer cathode by interposing an element having at least one texturized surface between the depolarizer mix and a compression source and embossing the texture onto the cathode slab formed by the application of pressure from the pressure source. Improved capacity and improved low temperature performance resulted from the electrodes prepared by practice of this invention.

9 Claims, 3 Drawing Figures

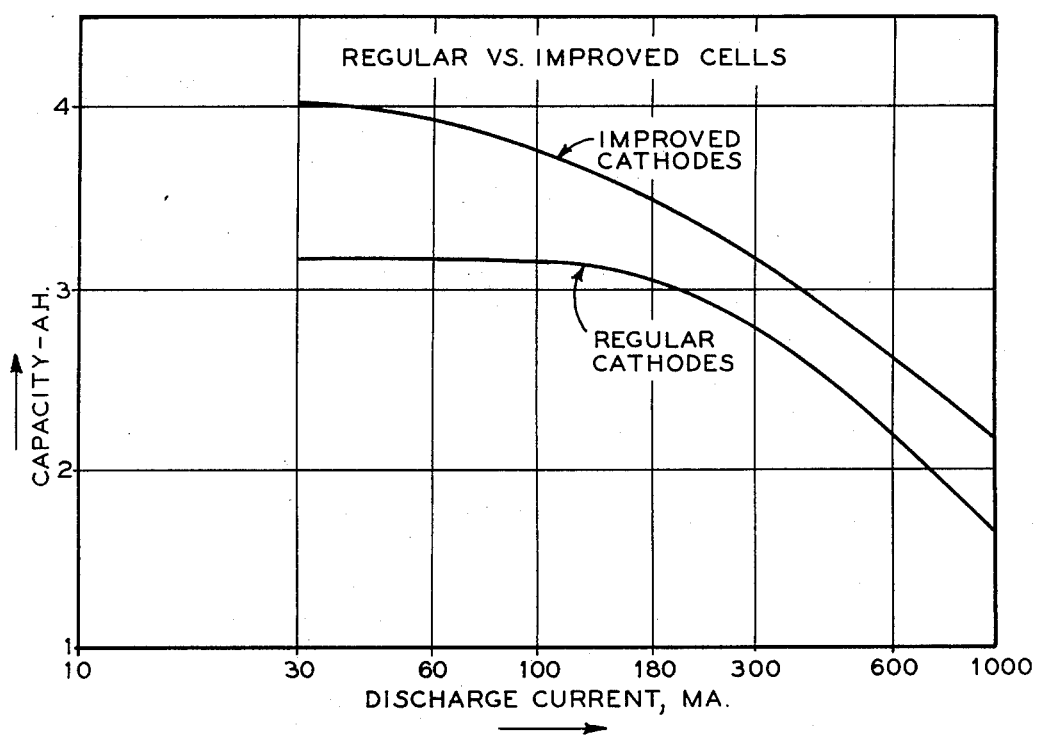

METHOD FOR PREPARING TEXTURIZED CATHODES

FIELD OF THE INVENTION

This invention relates to electrodes for electrochemical cells and more particularly to a method for making such electrodes for service in depolarizing cells where access of the electrolyte to the cathode may be a performance-limiting factor.

In many cells, particularly those employing extremely active anodes to provide high voltages such cells are limited in their discharge rates by the depolarizing reactions at the cathode. While such shortcomings have been noted with aqueous alkaline cells using zinc as the anode, due to the high ionic mobility in aqueous systems it is not too important a factor. However, with the advent of the use of more active anodes, i.e. capable of displacing hydrogen from water, such active anodes necessitate the use of nonaqueous electrolytes. Due to the lower ionic mobility in such electrolyte systems the effects of the depolarizer reaction at the cathode surface have become rate-limiting factors.

THE INVENTION

This invention is based upon the discovery of a method for improving the surface condition of depolarizer cathodes so as to afford the possibility of higher discharge rates.

This invention provides a method for preparing depolarizer cathodes having surfaces embossed with patterns to provide texturized surfaces. The cathode mix is texturized by compacting the mix to form the cathode slabs by applying pressure to the mix through a texturized layer that is in contact with the mix thereby embossing the texture onto the compressed slab of depolarizer. After the slab is compressed, the pressure is released and the texturized embossing layer is removed from the embossed slab. The slab is then further processed as necessary to prepare electrodes therefrom. The electrodes prepared according to the method of this invention consistantly provide improved performance in test cells discharged at low, intermediate and higher rates as compared to cells, similarly prepared but without the embossing of the texturized surfaces onto the cathode slab.

DETAILED DESCRIPTION

Figure 1:
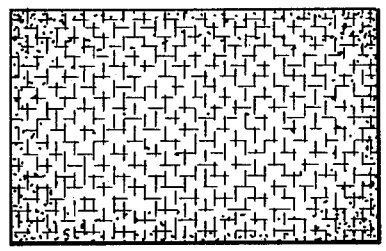

A detailed description of the invention will be made with reference to the drawing wherein FIG. 1 is a representation of the surface of a texturized electrode according to this invention.

Figure 2:
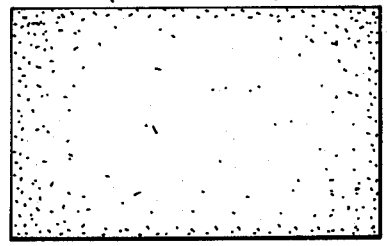

FIG. 2 is a similar representation showing the untexturized cathode surface according to the prior art.

FIG. 3 is a graphic comparison between the cells containing cathodes fabricated according to this invention and as shown in FIG. 1, and the cells containing the prior art cathodes as shown in FIG. 2 wherein the capacities of the cells are plotted at various discharge rates. The conditions for this comparison are set forth in the example. The texturizing process of this invention is particularly useful in the preparation of cathodes for use in cells based upon non-aqueous electrolyte systems, but is also useful in the preparation of cathodes for use in aqueous systems.

The term "active metal" as used in conjunction with non-aqueous electrolyte systems as used herein, refers to metals above hydrogen in the electromotive series and particularly those metals which will displace hydrogen from water or aqueous solutions. These include lithium, sodium, potassium, calcium and magnesium among the low molecular weight active metals. Cesium and rubidium are examples of active metals of higher molecular weight. Other active metals may also be used but are less efficient due to their higher molecular weights.

Solvents for the non-aqueous electrolytes are well known and include among others, tetrahydorfuran, propylene carbonate, dimethyl sulfoxide, dimethyl formamide, gamma-butyrolactone, dimethyl carbonate, N-nitroso-dimethylamine, acetonitrile, dimethyl sulfite, N,N-dimethylformamide and mixtures thereof.

The electrolyte salts dissolved in the above solvents for providing ionic conductivity to the electrolyte include the following salts of the active metals: chlorides, bromides, iodides, perchlorates, hexafluorophosphates tetrafluoroborates, hexafluoroarsenates, and tetrachloroaluminates.

The cathode mixes with which the process of this invention may be practiced include both the gas cathode mixes and the depolarizer mixes.

The gas cathode mixes are those mixes which may be formed into gas-permeable, liquid-permeable films upon the surface of which the electrolyte reaction is completed by an oxidizing gas diffusing through the body of the gas permeable cathode. The films for such electrodes include the gas permeable polymeric binders for catalytic cathodic materials. Suitable binders include the fluorocarbons and the chlorofluorocarbons sold under the trademarks Teflon and Kelef. These are polyfluoro and polyfluoropolychloro olefin polymers. They are commercially available. Other suitable binders are the film-forming polyolefins rendered gas-permeable and liquid-impermeable by various known treatment methods. The choice of binders is, of course, restricted to those that are insoluble and unreactive in the electrolyte used in the cell. This selection is particularly important when organic solvent-based electrolytes are used.

Catalysts used for such gas electrodes, depolarized particularly for use in fuel cells and semi-fuel cells, include the platinum elements in extended surface form, activated carbons, silver, mercury and certain semiconductor oxides. Such fuel cell or semi-fuel cell cathodes, when prepared with the texturized surface treatment according to this invention, all exhibited more rapid rise to operating voltages and particularly such cathodes were useful when operating gas-depolarized cells at temperatures between 0° and 20°C.

The chemical depolarizer cathodes with which the process of this invention is particularly useful, are those where the cathodes include metal oxides, chromates, vanadates, permanganates, molybdates, periodates, metal halide complexes and metal halides. The metals preferably are those which are insoluble in and are unreactive with the electrolyte and its solvent. These are primarily the heavier metals having at least two stages of oxidization. Also included among the depolarizers is activated carbon in electronically conductive form. The carbon may be used as the depolarizer in which case it may possibly act in a catalytic fashion in conjunction with absorbed or dissolved gases or it may be included or admixed with the chemical depolarizers for its faculty of improving the electronic conductivity of the cathode mix. These chemical cathode mixes preferably include binders for consolidating the crystalline or amorphous components of the mix into a solid and preferably self-supporting cathode element or slab, upon the application of pressure. The binders suitable for use in the process of this invention include the aforesaid fluorocarbon polymers and polymeric emulsion binders of these and other polymers. Some such binders, if unreactive within the cells, may be permitted to remain in situ, others preferably may be removed by baking or solvent leaching after the cathode slab has been consolidated. Some of the binders particularly the fluorocarbon polymer emulsions may require a baking step for the slab after its consolidation by pressure in order to cause a liberation of the polymer from the emulsion and to facilitate the permanent consolidation of the slab.

The cathode mix may also contain various supporting materials to improve the conductivity and/or structural strength of the finished cathode. Among such inclusions there may be mentioned metallic powders or fibers, porous perforated metal films, carbon powder, carbon filiments, or expanded metal grids. These are embedded or mixed within the body of the cathode mix, prior to its consolidation. The presence or absence of such inclusions is not specifically relevant to this invention, but their use in conjunction therewith provides certain ancillary improvements.

The cathode slabs are prepared according to the method of this invention by two variants of the basic method; one, a batch-wise production procedure and the other, a continuous production procedure.

In the batch method the requisite amount of cathode mix is placed into a die cavity and covered with a sheet of texturized material, whose pattern is to be embossed upon the cathode slab. Pressure is then applied to the mix through the texturized material via a ram or a similar pressure member. The amount of pressure need be merely sufficient to compact and consolidate the mix to a self-supporting slab in the case where further consolidation is achieved by baking; or the pressure may be sufficient to completely set the binder. The baking heat, where such is necessary, may be simultaneous with the pressure application either through the die body itself or via a heated pressure member. After completion of the pressure cycle, the pressure member is retracted and the texturized material is removed from the consolidated slab leaving behind a slab with an embossed surface. The slab may be embossed on both of its major faces by inserting one film of texturized material into the die before the mix is filled therein and another film of the texturized material upon the filled mix. After the texturizing treatment and baking or similar, consolidation treatment if necessary, the slab is trimmed to form one or more electrodes of proper size, and terminal tabs are attached to complete the electrodes.

In practising the invention according to the continuous mode, the mix is continuously deposited on a continuous or extended sheet base which may or may not be texturized. The mix is then covered with another sheet of preferably texturized material. The composite depolarizer mix "sandwich" is then compacted or compressed either between platens or between pressure rollers. The compacted mix, preferably self-supporting, is then stripped of its texturizing sheets and if necessary, heat treated. The consolidated slab may be used directly by trimming to size and attaching terminal tabs as is the usual procedure for untexturized cathodes.

Basically, the catalytic or chemical depolarizing cathodes may be made in similar fashions, but the catalytic cathodes, by their very nature of requiring gas permeability through the body of the cathode, are preferably much thinner than the chemical cathodes. The latter utilize the cathode body itself as a source of active depolarizing material, and this must be present in stoichiometric amount. In order to provide sufficient depolarizer activity for a ultimate use, the cathode must therefore have sufficient weight of active depolarizer to provide the necessary electrochemical capacity.

The texturized material may be any film having at least one surface with bas-relief irregularities and of sufficient relief to be capable of embossing these irregularities upon the cathode mix. Preferred materials are woven or knitted cloths, or screens of nylon, metal or polyester. Polyolefin or other polymeric materials may also be used. Preferred are cloths or screens woven of nylon monofiliment as such have exhibited the best separation from the compacted mix. However, other woven materials have also proven satisfactory as have embossed films. The pattern of the embossed texture is not too important, as long as the embossed surface area is at least 10 percent greater than that of the unembossed surface.

Generally, nylon monofiliment screens have been found to increase the surface area by up to about 50 percent and are therefore preferred. Any textures which will yield even greater surface areas, up to about 100 percent increase in surface areas, are of course optimal.

The adherence of the cathode mix to the cloths varies with the nature of the binders, the degree of compression and the nature of cloths. As set forth monofiliments i.e. having minimal interupted fiber elements within the strands of the weave are to be preferred.

The texture of the embossment is of minor importance provided that the mean top bottom distances of the embossment is not so great as to limit the chemical activity at the surfaces of the cathode that are proximate to the anode and thus losing the surface activity distal to the anode. The spacing or channels to the distal portions of the cathode, must be adequate to provide a ready excess and circulation of the electrolyte to those portions, in order to permit full utilization of the cathode and electrolyte at high discharge rates.

The following example compares the cathodes prepared according to this invention, with cathodes prepared with smooth surfaces as shown in FIG. 2 according to the procedures of the prior art.

EXAMPLE 1

Twenty-eight cells were made using cathodes fashioned of carbon mix containing 10 weight percent of Teflon as a binder. These were assembled into cells using lithium anodes, an organic electrolyte consisting of 1 molar lithium perchlorate in tetrahydrofuran, and having liquid $SO_2$ dissolved therein as the depolarizer. One-half of the cathodes were made using smooth surface cathodes, the other half of the cathodes were rolled between nylon screens that were later separated from the cathode leaving behind an imprint of the screens on the cathode surface. These nylon screens had a nominal 15 mesh.

All the cells were discharged fresh in groups of four, at each discharge rate; two cells with the regular type cathodes and two with cathodes having texturized surfaces. A superior performance was obtained from all the cells with texturized surface cathodes relative to cells with regular type cathodes. From observation of the reaction within the cells and the discharge curves, it can be seen that the texturized surfaces avoid inactivation of the electrode surface by the accumulation of the products of the electrochemical discharge reaction. The texturizing treatment also improves the mass transport of the active components of the electrolyte to the active sites on the electrode. It has also been found that the texturizing treatment improved the displacement of gases from the porous body of the electrode during the filling of the cells with the electrolyte.

Further advantage will be apparent to those skilled in this art. While representative materials have been included in the description of the invention above, it is to be understood that these are merely representative and that all equivalent materials recognized by the art are intended.

What is claimed is:

1. A method for preparing depolarizing cathodes of improved performance which comprises (A) interposing an element having at least one texturized surface between the depolarizer mix and a compression source, (B) forming a cathode slab and embossing the texture thereon by applying pressure from said source to said mix through said element (C) releasing the pressure, (D) removing said element from said formed slab and (E) preparing electrodes from said slab.

2. The method according to claim 1, wherein the element having the texturized surface is a woven cloth or screen.

3. The method according to claim 1, wherein the depolarizer mix and the texturized surface are placed within a die cavity and the pressure element is a ram or platen.

4. The method according to claim 1, wherein the pressure element is at least one pressure roller.

5. The method according to claim 4, wherein the cathode mix on a carrier film is fed through a series of pressure rollers.

6. The method according to claim 1, wherein subsequent to the application of pressure, the formed slab is subjected to a heat treatment.

7. The method according to claim 1, wherein the depolarizer mix includes a polymeric binder.

8. The method according to claim 7, wherein the polymeric binder is in the form of a polymeric emulsion including a fluorocarbon.

9. The method according to claim 8, wherein subsequent to the application of pressure to the mix and the formation of the formed slabs, said slab is heat treated at a temperature sufficient to decompose the emulsion binder and to set the polymer through the body of said slab.

* * * * *